United States Patent [19]
Urano

[11] 3,990,089
[45] Nov. 2, 1976

[54] CAMERA SHUTTER MULTI-MODE CONTROLLER PROVIDING IN ONE MODE A POWER-SAVING INTERVAL

[75] Inventor: Fumio Urano, Omiya, Japan

[73] Assignee: Asahi Kogaku Kogyo Kabushiki Kaisha, Tokyo, Japan

[22] Filed: Oct. 29, 1975

[21] Appl. No.: 626,967

[30] Foreign Application Priority Data
Nov. 2, 1974   Japan.............................. 49-126795

[52] U.S. Cl.................................. 354/242; 354/51; 354/60 R
[51] Int. Cl.²........................ G03B 9/34; G03B 9/58
[58] Field of Search................ 354/48, 50, 51, 60 R, 354/242, 226

[56] References Cited
UNITED STATES PATENTS

| | | | |
|---|---|---|---|
| 3,688,674 | 9/1972 | Kuramoto et al. | 354/242 X |
| 3,821,757 | 6/1974 | Kobori | 354/51 |
| 3,882,511 | 5/1975 | Tsujimoto et al. | 354/60 R X |
| 3,900,857 | 8/1975 | Tsujimoto et al. | 354/50 |

Primary Examiner—Joseph F. Peters, Jr.
Attorney, Agent, or Firm—Christie, Parker & Hale

[57] ABSTRACT

The controller of this invention is an electromechanical arrangement for controlling the operation of a camera shutter of the focal plane type. An electromagnet in the controller serves as a transducer between electrical and mechanical portions. The electrical portion includes switching circuitry that operates in either a first or a second mode depending upon how long an exposure interval is required. A key feature involved in the second mode is that the switching circuitry provides energization current to the electromagnet for first and second sub-intervals separated by a power-saving interval during which the electromagnet is deenergized. The mechanical portion is arranged so that the follower curtain of the shutter is released in accordance with either first or second disengageable stop means depending upon which mode the switching circuit operates in.

2 Claims, 7 Drawing Figures

CAMERA SHUTTER MULTI-MODE CONTROLLER PROVIDING IN ONE MODE A POWER-SAVING INTERVAL

BACKGROUND OF THE INVENTION

It is well known to employ an electromagnet as a transducer between electrical and mechanical portions of a camera shutter controller. In typical practice, the electromagent is energized and later de-energized with the point of time at which de-energization occurs being the determining factor as to exposure duration control.

In accordance with this typical practice, some mechanical element is for a time held fixed as a result of the magnetic attractive effects of the electromagnet. Upon de-energization of the electromagnet, the particular mechanical element is released so that it can move in response to spring biasing or the like. The ensuing movement brings about various results depending upon the particular type of camera involved. For example, in a camera having an objective shutter, the shutter blade is typically open while the electromagnet is energized and upon de-energization it closes in response to biasing force. In a camera having a focal plane shutter, the follower curtain of the shutter is released in response to de-energization of the electromagnet and it thereupon travels from its wound up position to its end position. Another example involves diaphragm blades which are held at a particular aperture according to particular photographing requirements.

The interval during which the electromagnet is maintained energized is a variable factor. For example, in connection with a shutter, this interval depends upon the appropriate exposure time. Accordingly, where a relatively long exposure time (e.g., in the order of two seconds) is appropriate, the typical practice involves energizing the electromagnet for a correspondingly long period. Consequently, considerable electrical power is consumed. This causes a problem with respect to draining the battery used in the camera. Usually, such a camera battery is a miniature one, owing to the severely limited space allotted thereto in the camera. This problem has created a substantial demand for an effective means for saving battery power consumption. From this viewpoint, disadvantages inhere in the electromagnetic mechanism adapted to be controlled through de-excitation in the manner described above. There has been proposed on arrangement such that the electromagnet is controlled through excitation with an impulse produced at a suitable time point, using a permanent magnet as the magnetic core. However, this arrangement also has been disadvantageous in that a magnetic time lag is involved in the releasing operation. That is, a relatively prolonged time lapse follows de-energization of the electromagnet before the moment at which the electromagnet presents a given magnetic force. The releasing operation itself is apt to be unstable inasmuch as the electromagnet should be electrically polarized in opposition to the polarity of the permanent magnet. Accordingly, the magnet assembly as a whole should be unexcited. Particularly when adapted for use with the camera shutter, this arrangement presents serious disadvantages in that it is difficult to maintain a desired accuracy in cases where relatively brief exposures are required.

SUMMARY OF THE INVENTION

This invention is directed to an electro-mechanical controller embodied in a camera having a shutter including a leading curtain and follower curtain. The two curtains provide for defining an exposure operation in which initially the leading curtain is released from a wound-up position to translate to an end position, and in which after the release of the leading curtain the follower curtain is released to translate behind the leading curtain. The controller comprises an electrical portion, a mechanical portion, and an electromagnet which serves as a transducer between the electrical and mechanical portions.

The electrical portion includes variable-delay timing circuit means for producing a first signal defining a computed exposure interval. Fixed-delay timing circuit means in the electrical portion produce a second signal defining a predetermined time interval. Switching circuit means responsive to the first and second signals provide for switchably supplying energization current to the electromagnet in either a first mode or second mode of operation. The switching circuit means operates in its first mode of operation in the event that the computed exposure interval is shorter than the predetermined time interval, and, in the course of this mode, provides the energization current throughout the computed exposure interval. The switching circuit means operates in its second mode of operation in the event that the computed exposure interval is longer than the predetermined time interval, and, in the course of this mode, provides the energization current for first and second sub-intervals separated by a power-saving interval during which the electro-magnet is de-energized.

The mechanical portion includes first stop means for controlling the release of the follower curtain when the switching circuit means operates in its first mode. It also includes second stop means for controlling the release of the follower curtain when the switching circuit means operates in its second mode.

Preferably, the first stop means includes a lock member mechanically coupled to the follower curtain and oriented to revolve about an axis so as to move in a circular path while the follower curtain translates. It also preferably includes a rotatable locking member mechanically coupled to the electromagnet and having a portion that swings into and out of the circular path for respectively engaging with and disengaging from the lock member.

Preferably, the second stop means employs the same lock member as the first stop means. It also preferably includes a rotatable restraining member and a mechanism for controlling the rotation thereof. This mechanism is operative in the case of the second mode of operation to cause the restraining member to rotate so that a portion thereof swings into the circular path to engage the lock member. Then, when the electromagnet is re-energized by the switching circuit means, the mechanism causes the restraining member to rotate so as to disengage from the lock member. With the lock member being disengaged from both the locking member and the restraining member, the lock member is released so that the follower curtain is allowed to translate.

BRIEF DESCRIPTION OF THE DRAWINGS

FIGS. 2 and 3 are plan views showing sequential stages of operation of the shutter mechanism of FIG. 1, in which FIG. 2 depicts the operating conditions immediately after initiation of shutter release and before the leading curtain has begun to translate, and FIG. 3 depicts the operating conditions prevailing in the course of a long exposure operation at a point at which the follower curtain is temporarily locked;

DETAILED DESCRIPTION

Figure 1:
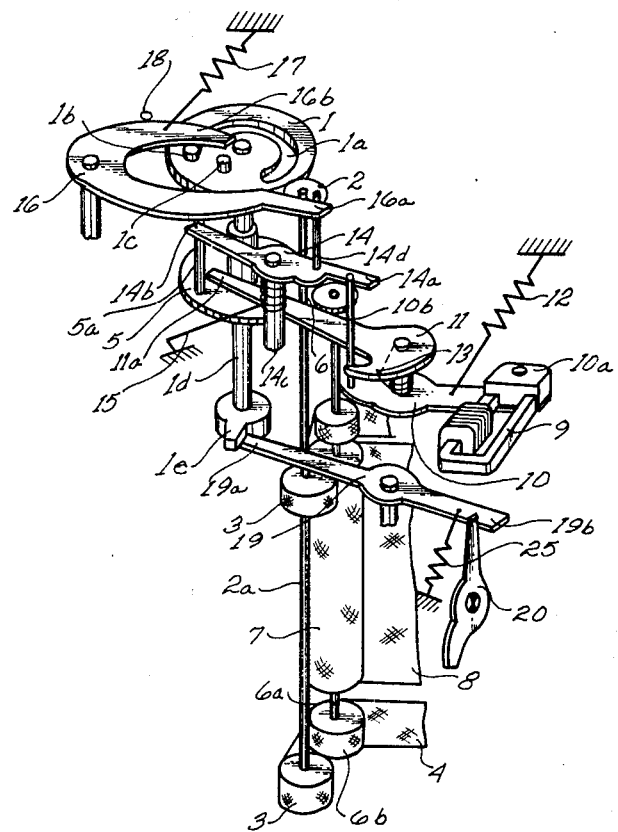
FIG. 1 is a perspective view showing a preferred embodiment of the present invention as incorporated into a camera having a focal plane shutter.

With reference to FIG. 1, there will first be described in detail the structure of the mechanical portion of the preferred embodiment of this invention. A gear 1 is operatively associated with a leading curtain (not shown) of a focal plane shutter in a camera. Many conventional features of the camera such as the camera body, shutter button, lens, etc., are not shown because they are not pertinent to an understanding of the present invention. A slit 1a is defined in the gear 1, and has the shape of a circular arc. A pin 1c is affixed atop gear 1. A gear shaft 1d depending from the gear 1 has on its lower end a projection 1e used in connection with the locking of the leading curtain. The operative coupling from the gear 1 to the leading curtain is established through a leading curtain pinion 2, a pinion shaft 2a, a roller 3 fixed on the pinion shaft 2a, and a ribbon 4 affixed on the roller 3. This type of arrangement for operative coupling is conventional in cameras employing a focal plane shutter, and the details thereof will not be further described herein. A gear 5 is operatively associated with a follower curtain 8. A relatively long pin or lock member 5a is affixed atop the gear 5, and an upper end of the pin 5a extends through the slit 1a of the gear 1. Accordingly, for shutter charge, transmission of a torque from a group of gears (not shown) is accomplished so that torque is first transmitted to the gear 1 and thereby one end 1b of the slit 1a bears against the end of the pin 5a so as to rotate the gear 1 and the gear 5 clockwise as seen in FIGS. 1-4. The gear 5 is in engagement with a follower curtain pinion 6. The follower curtain 8 has one end affixed on a roller 7 fixed on a shaft 6a of the follower curtain pinion 6 so that the follower curtain may be wound around the roller 7. A roller 6b is rotatably supported on a shaft 6a of the follower curtain pinion 6, and the ribbon 4 serves to tighten the leading curtain at a given position by means of the roller 6b.

An electromagnet 9 is employed as an electromechanical transducer. An armature lever 10 has an armature 10a mounted thereon at one end with a proper gap with respect to the electromagnet 9. A pin 10b is affixed to the other end of the armature lever 10. A follower curtain locking lever 11 is mounted on a rotary shaft of the armature lever 10.

A spring 13 is wound around the rotary shaft and spring couples the two levers 10 and 11 to each other. The spring 13 is hung at its opposite ends on the two levers.

A spring 12 is suspended between the armature lever 10 and the camera body (indicated schematically). The spring 12 provides urging force to hold the armature 10a normally spaced from the electromagnet 9. An end 11a of the follower curtain locking lever 11 is advanced into and retracted from a circular path through which the pin 5a revolves. End 11a and the pin or lock member 5a cooperate to form a first stop means. That is, when the end 11a is advanced into the circular path so as to abut the pin 5a, the gear 5 is blocked from rotating counterclockwise.

A follower curtain restraining lever 14 is provided in the preferred embodiment to form part of a second stop means. Like the locking lever 11, the restraining lever 14 has an end 14b which in operation is advanced into and retracted from the circular path through which the pin 5a revolves.

The mechanism for controlling the movement of the restraining lever 14 includes a generally V-shaped lever or bell crank 16. The lever 16 is journaled on one side of the group of gears and has one leg 16b extending above the gear 1. This lever 16 is biased by a spring 17 suspended between a leg end 16b and the stationary camera body so that normally the lever 16 occupies a position wherein a side edge of the leg end 16b bears against a stopper 18. The other leg end 16a extends adjacent to a top of a pin 14d affixed atop the follower curtain restraining lever 14. The leg end 16a transmits the urging force of the spring 17 to the top of the pin 14d and thereby rotates the follower curtain restraining lever 14 counterclockwise as seen in the figures.

A counter-biasing spring 15 is wound around a shaft 14c to urge the restraining lever 14 toward clockwise rotation. The spring 17 is provided with a tension higher than that of the spring 15. The other end 14a of the restraining lever 14 is opposed to one side of the pin 10b planted on the end of the armature lever 10, and adapted to be urged by the pin 10b to rotate around the shaft 14c.

As to the mechanism involved in controlling the leading curtain, a leading curtain locking lever 19 has one end 19a which is advanced into and retracted from a range within which the leading curtain locking projection 1a is rotated so as to respectively to lock the leading curtain and to allow it to translate. A leading curtain releasing lever 20 strikes the other end 19b of the leading curtain locking lever 19 to rotate (clockwise as seen in the figures) the lever 19 against the effect of a restoring spring 25. This releases the leading curtain from the locking effect of the end 19a. This in turn results from a force provided from a conventional mirror-up mechanism (not shown) substantially upon completion of upward movement of the mirror in a single lens reflex camera.

Figure 2:
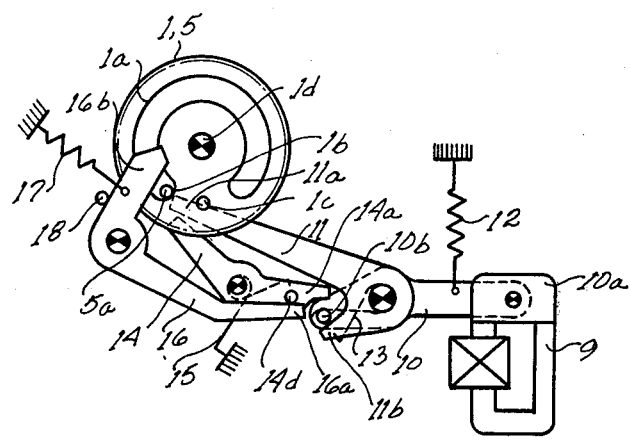

With more particular reference to FIGS. 2-4, there will now be described a sequence of operation involved in a relatively long-duration exposure. In accordance with conventional initiation of operation, the gear 1 is uncoupled from a mechanism for shutter release (not shown) in response to actuation of a shutter release effected on the camera side. The electromagnet 9 is energized so that the armature 10a, which is normally biased to be spaced from the electromagnet 9, is attracted by the electromagnet 9. It will be recalled that FIG. 1 is a perspective view showing the operating conditions prevailing upon completion of shutter charge. FIG. 2 relates to the operating conditions prevailing at a point in time at which a source switch included in an electric circuit system is closed. In short, upon shutter release, the electromagnet 9 is energized, the leading curtain is in a woundup position, and is ready to be released to translate to its end position.

As seen in a plan view of FIG. 2, the pin or lock member 5a is abutting the end 11a of the locking lever 11 and thereby the follower curtain is prevented from starting to translate. If the electromagnet 9 were to be de-energized at this point, the follower curtain would immediately start to translate because the armature lever 10 and the locking lever 11 respond to the urging of the spring 12 to rotate counterclockwise so that the end 11a of the lever 11 swings out of circular path of the pin 5a. This of course would allow the gear 5 to rotate whereupon the follower curtain would be released. Such an operation involving disengagement of a single stop in response to de-energization of an electromagnet as described above is well known in the prior art.

In accordance with this invention, a second stop means is involved in connection with the operation of the follower curtain. As the leading curtain departs, the gear 1 rotates counterclockwise and pin 1c revolves to abut and then force the leg end 16b of the lever 16 in the course of its counterclockwise rotation so as to overcome the urging of the spring 17 and rotate the lever 16 clockwise. As a result, the restraining lever 14, which has been held stationary by virtue of the engagement of the pin 14d and the other leg end 16a of the lever 16, now rotates clockwise under the effect of the spring 15. Thus, the end 14a swings into engagement with the pin 10b planted on the armature lever 10. Upon de-energization of the electromagnet 9 after this swinging action, the armature lever 10 is rotated under the effect of the spring 12 counterclockwise. Thus, the pin 10b and the follower curtain locking lever 11 rotate counterclockwise while the restraining lever 14 is clockwise rotated further, and with the end 14 thereof continuing to bear against the pin 10b owing to the resilient urging of the spring 15. Thus, even after the pin 5a has been disengaged from the locking lever 11, the end 14b of the restraining lever 14 now enters into the circular path of pin 5a to provide a separate stop. Accordingly, the follower curtain remains locked. The shaft 14c of the restraining lever 14 then serves as a stopper against rotation of the armature lever 10 and the locking lever 11.

Figure 3:
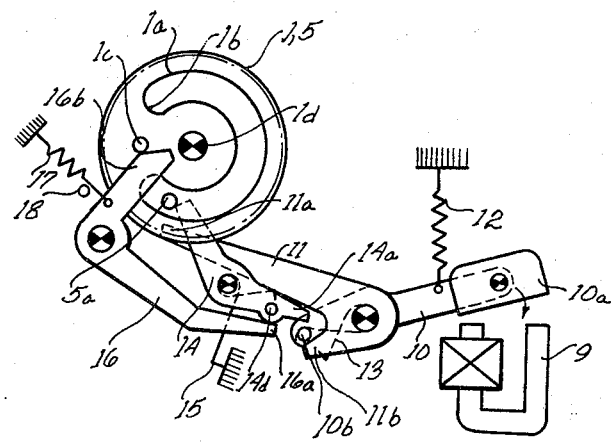

FIG. 3 relates to the next stage of operation; that is, as in a state where the follower curtain remains locked by the restraining lever 14. To release the follower curtain from this state, the electromagnet 9 is re-energized. When re-energization occurs, the armature 10a is attracted in the direction indicated by an arrow in FIG. 3, and the pin 10b planted on the armature 10 urges the end 14a of the restraining lever 14 to rotate the lever 14 counterclockwise. Thus, the end 14a of the lever 14 disengages from the pin 5a and thereby allows departure of the follower curtain. A smooth departure of the follower curtain may be achieved by selecting a length and/or configuration for the end 11a of the follower curtain locking lever 11 so that the end 11a cannot enter again into the circular path of the pin 5a. FIG. 4 shows the device according to the present invention as in a state where the follower curtain has been allowed depart.

In the case of the mode of operation for long-duration exposure with the device according to this invention, energization of the electromagnet 9 is once intercepted to change over the locking effect upon the follower curtain from the locking lever 11 to the restraining lever 14. After a suitable time is elapsed, the electromagnet 9 is re-energized to obtain an operation of the follower curtain controlled in a predetermined manner. The timing as to the change-over is influenced by the pin 1c. This pin 1c begins to urge the lever 16 before the completion of the translation of the leading curtain. More specifically, the time point at which the lever 16 releases the follower curtain restraining lever 14 is selected to coincide substantially with the time point at which the energization of the electromagnet 9 is once intercepted, and the latter time point is controlled slightly earlier to obtain the desired operation.

It will be understood that the exposure for a short time is achieved by a control through unexcitation or de-energization of the electromagnet 9 before the time point of the changing over. In this case, the operation of the locking lever 11 is determinative as to release of the follower curtain. It will also be understood that the exposure for a long time, on the other hand, is achieved by a control through excitation or re-energization of the electromagnet, with the re-energization occuring after the time point of the changing over. In this case, the operation of the restraining lever 14 is determinative as to release of the follower curtain.

The electrical portion will now be explained with reference to FIG. 5. The electric circuit illustrated in FIG. 5 corresponds to a switching section for the electromagnet 9, which section is only a part of the electronic shutter control circuit. A photographic operator section adapted to operate according to exposure factors such as light intensity of an object to be photographed may be optionally selected from various well-known circuits of this nature, and it is for this reason that only a circuit section adapted for control of the electromagnet is shown to facilitate understanding of the present invention. Opposite terminals of the electromagnet 9 are connected to output terminals of switching circuits $SW_I$ and $SW_{II}$, respectively. The operator section performs a photographic computation operation. The well known equation for this computation is expressed as $T_V = B_V + S_V - A_V$. It is based on three log-compressed factors. These factors are a log compressed light intensity of an object to be photographed ($B_v$, a log-compressed film sensitivity $S_V$), and a log-compressed diaphragm ($A_V$). In the circuitry, an electric current $i$ flows in proporation to an exposure time T wherein the electric value is generally log-extended. A capacitor $C_1$ is charged up by the electric current $i$ and thereby determines a time lag. A resistance R and a capacitor $C_2$ are R - C timer elements provided to determine a subinterval of re-energization of the electromagnet 9. This sub-interval is involved in the mode for exposure for a long time. A variable resistance is preferably employed as the resistance R so that a time point of changing over between unexcitation and excitation may be controlled in cooperation with the mechanical section. One terminal of this resistance R is connected to the base of a transistor $T_r$ and to the cathode of the diode D. The emitter of the transistor $T_r$ and the anode of the diode D are connected to one terminal of the capacitor $C_2$ and to an input terminal $c$ of the switching circuit $SW_{II}$, respectively. A reference voltage source $V_{S2}$ is connected to another input terminal of the switching circuit $SW_{II}$. The collector of the transistor $T_r$ is connected to an output terminal $d$ of the switching circuit $Sw_{II}$ so that a base voltage of the transistor $T_r$ may be used for feedback control. A power source $V_{S3}$ is adapted to energize the circuit through a source which (not shown). There are provided trigger switches $SW_{T1}$ and $SW_{T2}$ in parallel with the capacitor $C_1$ and $C_2$, respectively. These trigger switches are operatively associated in well-known manner with an initial movement of the gear 1. Thus, these trigger switches are simultaneously closed or simultaneously opened in order to control charging of the capacitors $C_1$ and $C_2$, respectively. The respective switches $SW_{T1}$, and $SW_{T2}$, are not shown in FIG. 1 since any one of these measures may be employed.

With the above-described circuit arrangement, the collector potential of the transistor $T_r$ is lower than the emitter potential thereof when the voltage at the point $c$ is lower than the voltage $V_{S2}$ corresponding to the reference level of the switching circuit $SW_{II}$, so that the transistor $T_r$ acts as a diode and charging of the capacitor $C_2$ is controlled by the variable resistance R. When the voltage at the point $c$ reaches the reference voltage $V_{S2}$, the voltage at the point D corresponding to the output terminal of the switching circuit $SW_{II}$ rapidly rises. A bias is given to the collector of the transistor $T_r$ and the electric current to be stored into the capacitor $C_2$ corresponds to the base current of the transistor $T_r$ determined by the variable resistance R which has been multiplied by the current amplification factor ($h_{FE}$) of said transistor $T_r$ and thus the voltage at the point c rapidly rises. The diode D is reverse biased when the capacitor $C_2$ is charged and forward biased when said capacitor is discharged, wherein the discharge is effected through said diode D and said variable resistance R.

Figure 5:
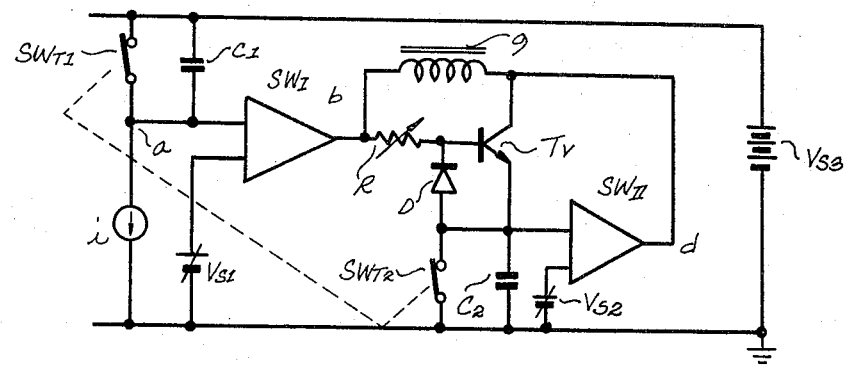
FIG. 5 is a circuit diagram illustrating an example of a circuit section adapted for control of the electromagnet, which section is included in the electronic shutter circuit used for implementation of the present invention.

In the state of the circuit as shown in FIG. 5, the switching circuit $SW_I$ is in closed position and the voltage at the output terminal B thereof is at the level of the source voltage $V_{S3}$. The switching circuit $SW_{II}$ is, on the contrary, in opened position and the voltage at the output terminal D thereof has dropped to the level of earth potential, so that the electromagnet 9 is being energized. Upon simultaneous closure of the trigger switches $SW_{T1}$ and $SW_{T2}$, the capacitors $C_1$ and $C_2$ begin to be charged, so that the voltage at the input terminal a of the switching circuit $SW_I$ gradually drops while the voltage at the input terminal $c$ of the switching circuit $SW_{II}$ gradually rises.

The manner in which this electric circuit arrangement operates will be now described separately in reference to the exposure for a short time and the exposure for a long time.

In the case of exposure for a short time

Figure 6:
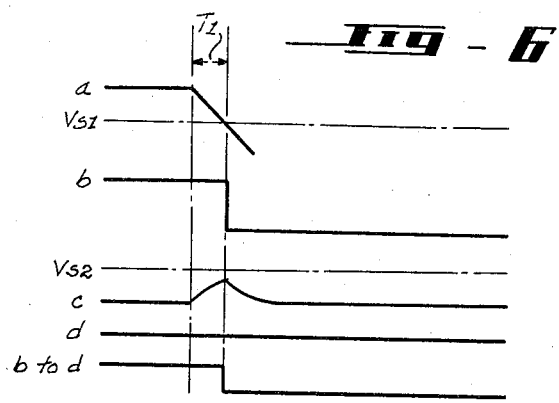
FIG. 6 is a group of wave form diagrams schematically illustrating, with reference to a first mode of operation, variations of voltages at respective points of the circuit shown in FIG. 5.

Variation in voltage at the respective points in the circuit as above mentioned together with variation in potential difference across the terminals of the electromagnet 9 is illustrated in FIG. 6, in which the axis of abscissa indicates time, the axes of ordinates indicates a voltage and the dot-dash line indicates a reference voltage. In the course of the gradual rising of the voltage at the point $c$, the voltage at the point a reaches its reference level voltage $V_{S1}$ before the voltage at the point $c$ reaches its reference level voltage $V_{S2}$, and only the switching circuit $SW_I$ is reversed and thereby the voltage at the output terminal B of said switching circuit $SW_I$ drops in a moment from the source voltage $V_{S3}$ to the earth potential. As a result, both terminals of the electromagnet 9 are now at the earth potential, namely, said electromagnet 9 is now de-energized and unexcited. Upon this unexcitation of the electromagnet 9, the follower curtain locking lever 11 is retracted from the circular path of the pin 5a to release the follower curtain and allows a departure thereof. Subsequently, the capacitor $C_2$ is discharged through the diode D and the variable resistance R. It will be appreciated that the voltage difference between the two inputs of the switching circuit $SW_I$ constitutes a signal defining a computed exposure interval. That is, the fact that this voltage difference equals zero marks the end of the computed exposure interval.

In the case of exposure for a long time

Figure 7:
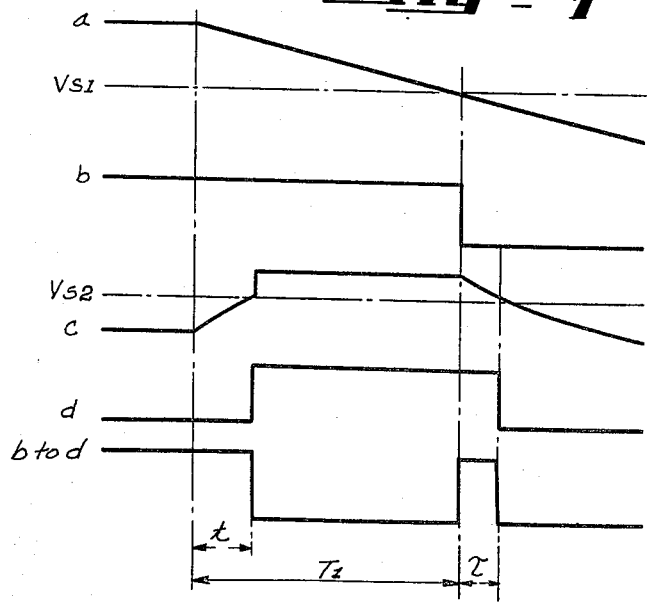
FIG. 7 is a group of wave form diagrams similar to those of FIG. 6, but with reference to a second mode of operation.

Variation in voltage at the respective points in the circuit as above mentioned together with variation in potential difference across the terminals of the electromagnet 9 is illustrated in FIG. 7 in which, as in FIG. 6, the axis of abscissa indicates time, the axes of ordinates indicates a voltage and the dot-dash line indicates a reference voltage. Once it reaches its reference level voltage $V_{S2}$, the voltage at the point $c$ rapidly rises and the switching circuit $SW_{II}$ is reversed, with the effect that the voltage at the point $d$ reaches the source voltage $V_{S3}$. The voltage at the point $b$ remains at the source voltage $V_{S3}$ on this time point and, accordingly, both terminals of the electromagnet 9 are balanced, namely the electromagnet is de-energized. It will be appreciated that the voltage difference between the two inputs of switching circuit $SW_{II}$ constitutes a signal defining a predetermined time interval. That is, the fact that this voltage difference equals zero marks the end of the predeteramined time interval.

Figure 4:
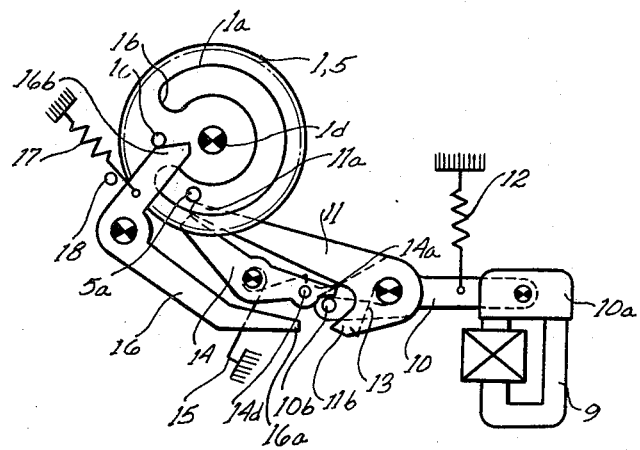
FIG. 4 is a plan view corresponding to FIG. 3 and depicts a condition immediately after the release of the follower curtain which was locked in the manner depicted in FIG. 3.

As seen in the previous description of the operating manner in reference with FIGS. 2 to 4, the time elapsing before the voltage at the point $c$ reaches its reference level voltage $V_{S2}$ may be selected so that the time piont at which said reference level voltage is reached substantially coincides with the time point on which the changing over of the follower curtain restraining lever 14 is effected. Thus, substantially upon completion of the leading curtain's running, the follower curtain is restrained despite its having been once released from the locking effect of the follower curtain locking lever 11. That is, it is restrained again by the follower curtain restraining lever 11 and prevented from its departure. When the voltage at the point a reaches its reference level voltage $V_{S1}$, the switching circuit $SW_I$ is simultaneously reversed and the voltage at the point $b$ drops down to the earth voltage. At this time point, the voltage at the point $d$ is held at the source voltage $V_{S3}$ and there is produced again a potential difference across both terminals of the electromagnet 9 which is thereby re-energized. When the voltage both at the points $b$ and $d$ are thus at the source voltage $V_{S3}$, the potential of the capacitor $C_2$ is also substantially at said source voltage $V_{S3}$ and the diode D is in a reverse biased state, so that, when the voltage at the point $b$ drops to the earth potential as above mentioned, the base voltage of the transistor $T_r$ becomes lower than the emitter voltage thereof and said transistor $T_r$ becomes nonconductive. The diode D is, on the other hand, forward biased and the capacitor $C_2$ is discharged through said diode D and the variable resistance R.

With the arrangement as aforementioned in which the time point of the mechanical change-over, i.e., the changeover of the locking effect upon the follower curtain from the follower curtain locking lever 11 to the follower curtain restraining lever 14 is adjusted so as to be slightly later than the time point of change-over in the electric circuit or the time point on which the switching circuit $SW_{II}$ is reversed by closure of the trigger switches $SW_{T1}$, and $SW_{T2}$, the electromagnet 9 is controlled through unexcitation as in the electronic shutter camera of prior art when the exposure time T is shorter than the time T elapsing before said reversion of the switching circuit $SW_{II}$ (i.e., $T_1$ in FIG. 6) and the electromagnet 9 may be controlled through excitation after once controlled through unexcitation (i.e., $T_1$ in FIG. 7). In the exposure for a long time $T_1$, accordingly, the period for energization of the electromagnet is reduced by $T_1 - (t = \pi)$ and the source consumption is correspondingly saved, as illustrated by FIG. 7. $\pi$ represents a time elapsing from re-energization of the electromagnet 9 to the time point at which said electromagnet is unexcited again and may be selected at a predetermined value sufficiently small that, even the $T_1$ value increases, the value of $T_1 - (T = \pi)$ is maintained constant and the source consumption by the electromagnet 9 is remarkably saved.

As understood from the aforegoing description, the device according to the present invention is extremely advantageous for a short time just as in the electronic shutter camera of prior art while an effective saving of consumption of the source battery by saving of electric current consumed by the electromagnet and the mechanical arrangement as well as the circuit arrangement required for these purposes may be effectively simplified so as to be incorporated into a limited space in the camera.

I claim:

1. In a camera having a shutter including a leading curtain and a follower curtain for defining an exposure operation in which initially the leading curtain is released from a wound-up position to translate to an end position, and in which after the release of the leading curtain the follower curtain is released to translate behind the leading curtain, an electro-mechanical controller comprising:
   an electrical portion;
   a mechanical portion; and
   an electromagnet serving as a transducer between the electrical and mechanical portions;
   the electrical portion including:
   a. variable-delay timing circuit means for producing a first signal defining a computed exposure interval.
   b. fixed-delay timing circuit means for producing a second signal defining a predetermined time interval;
   c. switching circuit means responsive to the first and second signals for switchably providing energization current to the electromagnet in either a first mode or second mode of operation;
   the switching circuit means operating in its first mode of operation in the event that the computed exposure interval is shorter than the predetermined time interval, and, in the course of this mode, providing the energization current throughout the computed exposure interval;
   the switching circuit means operating in its second mode of operation in the event that the computed exposure interval is longer than the predetermined time interval, and, in the course of this mode, providing the energization current for first and second sub-intervals separated by a power-saving interval during which the electromagnet is de-energized; and
   the mechanical portion including:
   a. first stop means for controlling the release of the follower curtain when the switching circuit means operates in its first mode; and
   b. second stop means for controlling the release of the follower curtain when the switching circuit means operates in its second mode of operation.

2. An electro-mechanical controller according to claim 1 wherein the first stop means includes a lock member mechanically coupled to the follower curtain and oriented to revolve about an axis so as to move in a circular path while the follower curtain translates, and further includes a rotatable locking member mechanically coupled to the electromagnet and having a portion that swings into and out of the circular path for respectively engaging with and disengaging from the lock member; and wherein the second stop means includes a rotatable restraining member and a mechanism for controlling the rotation of the restraining member so that a change over operation occurs in which a portion of the restraining member swings into the circular path to engage the lock member and swings away in response to re-energization of the electromagnet.

* * * * *